United States Patent [19]
Mitsui

[11] 3,831,071
[45] Aug. 20, 1974

[54] BRUSHLESS DIRECT CURRENT MOTOR & CONTROL THEREFOR

[75] Inventor: Yoshihiro Mitsui, Matsumoto, Japan

[73] Assignee: Kabushiki Kaisha Suwa Seikosha, Tokyo, Japan

[22] Filed: Aug. 14, 1972

[21] Appl. No.: 280,705

[30] Foreign Application Priority Data
Aug. 18, 1971 Japan.............................. 46-62278

[52] U.S. Cl.................. 318/254, 318/138, 310/156
[58] Field of Search..................................... 318/254

[56] References Cited
UNITED STATES PATENTS

| | | | |
|---|---|---|---|
| 3,402,333 | 9/1968 | Hayner et al. | 318/254 X |
| 3,483,456 | 12/1969 | Brunner et al. | 318/254 X |
| 3,599,050 | 8/1971 | Komatsu | 318/254 X |
| 3,603,161 | 9/1971 | Schwarz | 318/254 X |

OTHER PUBLICATIONS
IBM Tech. Disc. Bulletin, J. A. Glockler et al., Brushless D.C. Generator, Vol. 11, No. 11, April 1969, pgs. 1581 & 1582.

Primary Examiner—T. E. Lynch
Attorney, Agent, or Firm—Blum, Moscovitz, Friedman & Kaplan

[57] ABSTRACT

A brushless direct current motor is formed with a rotor having a magnetic construction in which the direction of magnetic flux is parallel to the rotary axis of the motor. At least one magnetic sensitive element is disposed in the magnetic flux of the rotor for detecting the state of said flux. A base plate is provided on which driving coils are disposed, the current controlled by a signal from said magnetic sensitive element is supplied to said driving coils to drive said rotor.

11 Claims, 11 Drawing Figures

BRUSHLESS DIRECT CURRENT MOTOR & CONTROL THEREFOR

BACKGROUND OF THE INVENTION

This invention relates to brushless direct current motors using hall elements. In conventional motors utilizing hall elements to actuate the driving coils thereof, the rotor is magnetized in the radial direction relative to the axis of rotation thereof, and the hall elements are disposed outside the path of rotation of the rotor radially aligned with said rotor. This construction has caused inefficiencies in the operation of the hall effect devices, and has resulted in the production of motors which are relatively long in the axial direction, and are costly to produce. By providing a rotor having a magnetic construction at which the direction of magnetic flux is parallel to the rotary axis of the motor, and by proper positioning of the hall effect device, these deficiencies are overcome.

SUMMARY OF THE INVENTION

Generally speaking, in accordance with the invention, a brushless direct current motor is provided including a rotor having a magnetic construction in which the direction of magnetic flux is parallel to the rotary axis of said motor, at least one magnetic sensing element positioned in the magnetic flux of said rotor for detecting the state of said magnetic flux, a base plate on which driving coils are disposed, and control circuit means interconnecting said magnetic sensitive element and said driving coils for supplying driving current to said driving coils in response to the signal produced by said magnetic sensitive element.

Accordingly, it is an object of this invention to provide a motor where, due to the shape of the rotor magnet, hall elements are arranged in a uniform magnetic field produced by said rotor magnet so that the efficiency of generation of the hall voltage is increased, and so that special mounting devices for the hall element is not required.

Another object of the invention is to provide a motor wherein, due to the shape of the rotor magnet and the shape of the driving coils, said driving coils are arranged in the uniform magnetic field of said rotor magnet to increase the efficiency of the motor.

A further object of this invention is to provide a flat-shaped motor through design of the rotor and stator.

Still another object of the invention is to provide a motor having favorable torque characteristics wherein the current flowing through the driving coil rises and drops quickly as the hall voltage of the hall elements disposed in the uniform magnetic field quickly appears and disappears.

Still a further object of the invention is to provide a motor wherein driving current is applied to each driving coil more than two times during each period of the motor.

An additional object of the invention is to provide a motor wherein the number of driving coils need not be changed even though the number of magnetic poles of the rotor magnet is changed.

Another object of the invention is to provide a motor wherein hall elements are arranged in the same plane as the driving coil to form a flat stator, said hall elements being mechanically protected.

Still other objects and advantages of the invention will in part be obvious and will in part be apparent from the specification and drawings.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
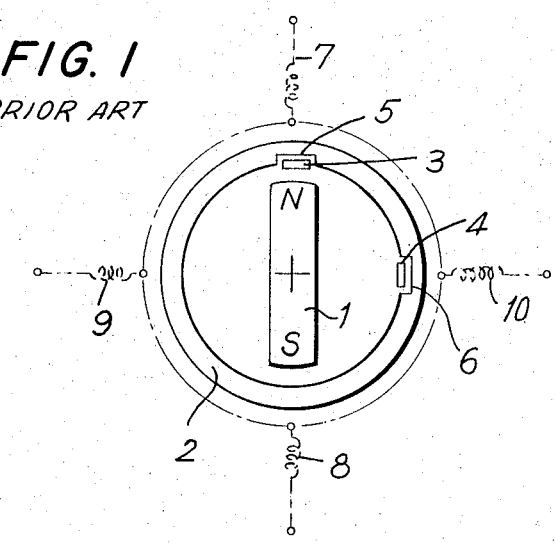
FIG. 1 is a partially schematic side elevational view of a conventional type of motor.

Referring now to FIG. 1, the conventional motor depicted consists of a rotor magnet 1 magnetized in the radial direction relative to the axis of rotation thereof. Hall elements 3 and 4 are disposed outside of the path of rotation of rotor magnet 1 on the radial periphery thereof and within the range of the magnetic field adjacent said rotor magnet. If the spacing between hall elements 3 and 4 and the rotor magnet is large, the input current to said hall elements must be enlarged, the thickness of the hall elements themselves must be thinned, or a large magnetic field is required. In the prior art arrangements, the value of the input current and the thickness of the hall elements are usually predetermined, so the rotor magnet 1 and hall elements 3 and 4 are designed to be positioned very closely. However, there is a limit as to the closeness of the relative position thereof due to the method of positioning hall elements 3 and 4 and the mechanical strain placed on the hall elements. Accordingly, an attachment means 2 is provided outside of the hall elements 3 and 4 adapted to readily pass the magnetic flux of rotor magnet 1. Thus, the prior art arrangement requires a separate attachment means 2, formed with fixed positioning slots 5 and 6. These additional parts complicate the device and increase the production costs thereof.

Further, in conventional types of motors, the driving coils must be disposed in parallel with the axis of rotation of the rotor so that the length of the motor is lengthened in the axial direction, a substantial disadvantage. Since a base plate having transistor circuitry must be mounted outside the motor and connected to the motor by lead wires, additional space is required for mounting the base plate, making the conventional motor still larger.

Figure 2:
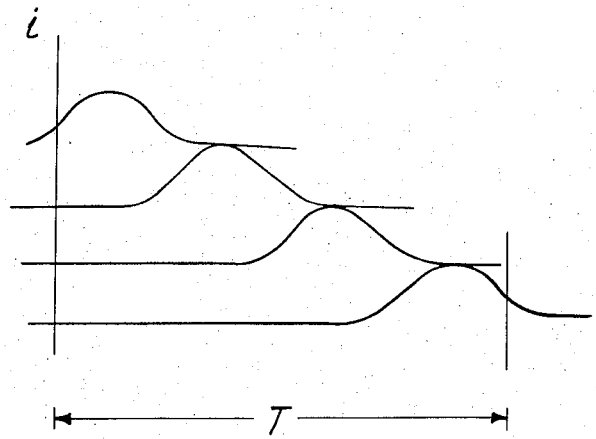
FIG. 2 is a waveform diagram showing the current flowing through each of the driving coils of the conventional motor of FIG. 1.

FIG. 2 shows the waveforms of the current i flowing through four driving coils 7, 8, 9 and 10 of the motor of FIG. 1 during the period T of said motor. The current flows through each driving coil once during each period T. Further, the rise and fall times of the hall voltage is slow so that the rising and falling of the current flowing through the driving coils is also slow. This results from the fact that the hall elements of the prior art motors are not disposed in a uniform field, but rather, in a magnetic field which increases and decreases with the relative displacement of the poles and the hall elements. Thus, the two poles of the rotor magnet are magnetized in the radial direction along a diameter relative to the axis of rotation of said rotor while the hall elements are angularly spaced by $\pi/2$ relative to each other.

Figure 3:
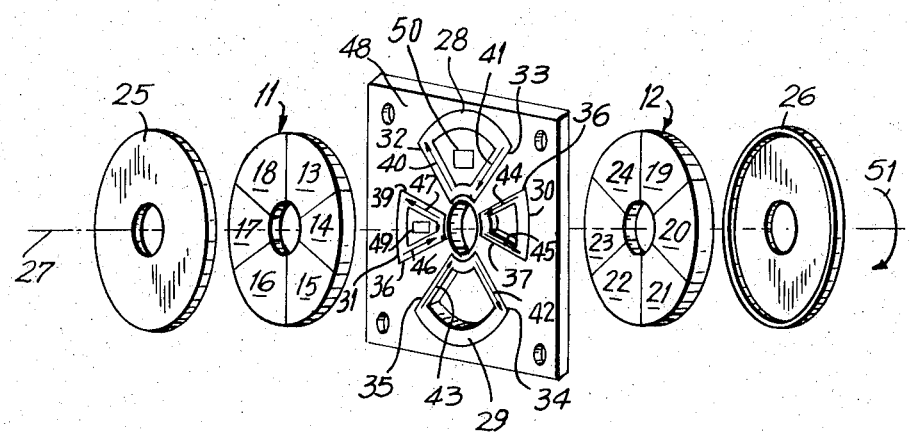
FIG. 3 is an exploded perspective view of the motor in accordance with the invention.
Figure 4:
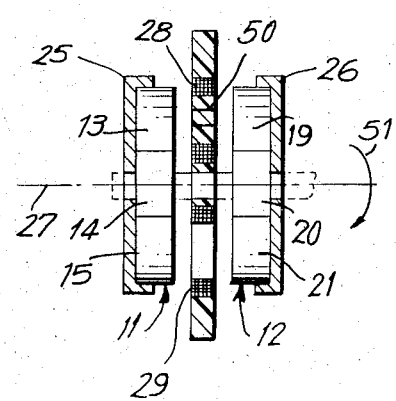
FIG. 4 is a partially sectioned view of the assembled motor of FIG. 3.

A first embodiment of the brushless direct current motor in accordance with the invention is depicted in FIGS. 3 and 4. Said embodiment is provided with a pair of rotor magnets 11 and 12 magnetized in the axial direction and formed from a plurality of pie-shaped permanent magnets 13, 14, 15, 16, 17 and 18, in the case of rotor magnet 11, and permanent magnets 19, 20, 21, 22, 23 and 24, in the case of rotor magnet 12. Each adjacent pair of permanent magnets in each of the rotor magnets is oppositely polarized. Thus, the direction of magnetization of the permanent magnet in each $\pi/3$ sector of each of rotor magnets 11 and 12 is opposite to the direction of magnetization of the adjacent $\pi/3$ sectors. The poles of rotor magnets 11 and 12 are arranged and fixed so that poles of opposite polarity are in facing relation, the permanent magnets of rotor magnet 11 being mounted in yoke 25, the permanent magnet of rotor magnet 12 being mounted in yoke 26. Yokes 25 and 26 and rotor magnets 11 and 12 are all mounted for common rotation about rotary axis 27 to define the rotor of the motor. The rotor so formed has a uniform magnetic field due to the opposed spaced permanent magnets, the direction of the magnetic flux being parallel with the rotary axis 27.

Driving coils 28, 29, 30 and 31 are wound in a fan-shape so that their respective sides 32 and 33, 34 and 35, 36 and 37, and 38 and 39, may enclose a $\pi/3$ sector. The driving coils 28, 29 are angularly spaced from each other by $\pi$, driving coils 30 and 31 being angularly spaced from driving coils 28 and 29 by $\pi/2$ respectively, said four driving coils 28, 29, 30 and 31 being fixed on an insulating plate 48.

Hall elements 49 and 50 are also mounted on insulating plate 48. Hall element 49, which supplies the output signal for the driving coils 28 and 29, is angularly spaced from driving coil 28 by $\pi/2$ and is mounted within driving coil 31. Hall element 50 which supplies the output signal into driving coils 30 and 31, is spaced from driving coil 31 by $\pi/2$ and is mounted within driving coil 28. The stator of the motor is defined by insulating plate 48, the four driving coils 28, 29, 30 and 31, hall elements 49 and 50, and the transistorized driving circuit (not shown) which is also mounted on insulating plate 48.

The center holes formed in rotor magnets 11 and 12 and in yokes 25 and 26 are formed for permitting the mounting of said rotor magnets and yokes on an axial, the center hole in insulating plate 48 being provided for the passing of said axial therethrough.

Insulating plate 48 is disposed in a gap between rotor magnets 11 and 12. The respective sides 32, 33, 34, 35, 36, 37, 38 and 39 of driving coils 28, 29, 30 and 31, as well as the hall elements 49 and 50, are arranged so as to be included within the uniform magnetic field extending between rotor magnets 11 and 12.

As is more particularly shown in the sectional view of FIG. 4, the driving coils and hall elements are arranged so as to be included in the uniform magnetic field in parallel with the rotary axis of a pair of rotor magnets 11 and 12, and it is possible to close the gap between the pair of rotor magnets to the maximum extent, so long as insulating plate 48 is not engaged.

FIG. 4 also illustrates positioning of the four driving coils and two hall elements mounted on the insulating plate in a uniform magnetic field, said coils and hall elements being equally spaced from each of the pair of rotor magnets 11 and 12. The uniformity of the magnetic field results from the fact that the facing permanent magnets of said rotor magnets are of opposite polarity, the direction of the magnetic field alternating every $\pi/3$ sector. The hall elements 49 and 50 are positioned so that they are always subject to the influence of a perpendicular uniform magnetic field, thereby improving their efficiency of operation.

The motor depicted in FIGS. 3 and 4 can be formed in a very flat shape and is of simple structure. Since the transistorized driving circuit associated with said driving coils and hall elements may be mounted on insulating plate 48, ready assembly and disassembly of the motor and miniaturization thereof is readily achieved. Since the hall elements are fixed at the center of driving coils, they are protected from adverse influences due to contact and vibration.

Figure 5:
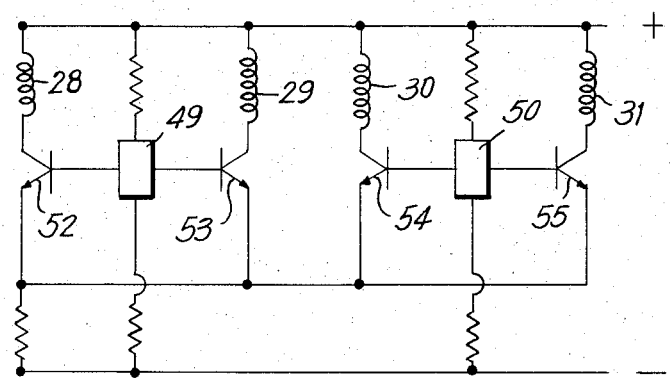
FIG. 5 is a circuit diagram of the control circuitry of the motor of FIG. 3.

Referring now to FIG. 5, a circuit diagram of a driving circuit for the motor of FIG. 3 is depicted. Said circuit includes driving transistors 52 and 53 having their respective bases connected to outputs of hall elements 49, the emitter-collector path of transistor 52 being connected in series with coil 28 while the emitter-collector path of transistor 53 being connected in series with coil 29. By this arrangement, driving transistors 52 and 53 serve to amplify the output signal of hall element 49 and to supply driving current to driving coils 28 and 29. In like manner, driving transistors 54 and 55 have their respective bases connected to the output of hall element 50, the emitter-collector path of transistor 54 being connected in series with coil 30 while the emitter-collector path of transistor 55 being connected in series with coil 31. Thus, driving transistors 54 and 55 serves to amplify the output of hall element 50 and to apply driving current to coils 30 and 31.

Figure 6:
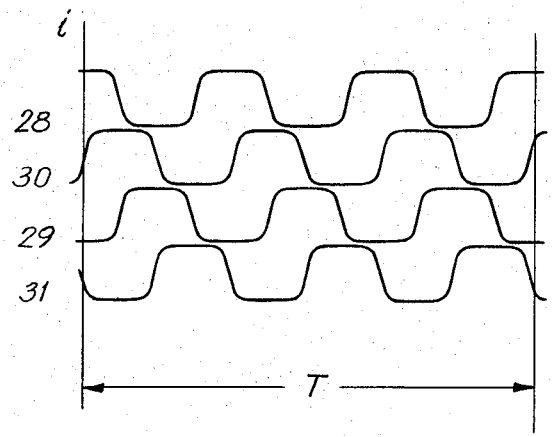
FIG. 6 is a waveform diagram showing the current flowing through each of the driving coils of the motor of FIG. 3.

The waveforms of the current in each of the four driving coils 28, 29, 30 and 31 during a single period T of the motor is depicted in FIG. 6. Input current is supplied to hall elements 49 and 50 when the power source is turned on, said hall elements each being connected between the positive and negative terminals of the power source intermediate a pair of resistors as illustrated in FIG. 5. If the stator and rotor are arranged in the relation depicted in FIG. 3, a magnetic field is applied to the hall element 49 by permanent magnets 17 and 23 of rotor magnets 11 and 12 respectively. On the other hand, hall element 50 is positioned at a dead point of the magnetic field. In this configuration, the hall voltage produced in the hall element 49 produces an input signal to operate driving transistor 52 to cause driving current to flow in driving coil 28.

When the current flows in the predetermined direction illustrated by arrows 40 and 41 in driving coil 28, the current flowing in side 32 of said coil interacts with the field produced by permanent magnets 18 and 24 of rotor magnets 11 and 12 while the current flowing through side 33 of said coil interacts with the field produced by permanent magnets 13 and 19 of said rotor magnets. This interaction causes the rotor to commence rotation in the predetermined rotary direction of arrow 51 (FIG. 3). Immediately after the rotor begins to rotate, the magnetic field is applied to the hall element 50 by permanent magnets 18 and 24 of rotor magnets 11 and 12, causing driving transistor 54 to apply current to driving coil 30 in the direction of arrows 44 and 45 (FIG. 3). The current passing through side 36 of driving coil 30 interacts with the magnetic field of permanent magnet 13 and 19 of rotor magnets 11 and 12 while the current passing through side 37 of said coil interacts with permanent magnets 14 and 20 of said rotor magnets. This interaction adds torque to the rotor in the direction of arrow 51. Thus, when the rotor rotates in the direction of arrow 51 by $\pi/6$ of its rotary angle, hall element 49 is positioned at the dead point of the magnetic field, so current flowing through driving coil 28 stops. The rotation of the rotor is maintained by the action of the current flowing through driving coil 30 and the magnetic field of rotor magnets 11 and 12. A magnetic field of opposite polarity is immediately applied to hall element 49 by permanent magnets 16 and 22 of rotor magnets 11 and 12, so that driving transistor 53 operates to apply current to driving coil 29 in the direction of arrows 42 and 43 (FIG. 3). The current flowing through side 34 of coil 29 interacts with permanent magnets 14 and 20 of rotor magnets 11 and 12 while the current flowing through side 35 of said coil interacts with permanent magnets 15 and 21 of said rotor magnets, to further add torque to the rotor in the direction of arrow 51.

When the rotor rotates in the direction of arrow 51 by a further $\pi/6$ of its rotary angle, hall element 50 is positioned at the dead point of the magnetic field so that the current flowing through the driving coil 30 stops. However, the rotor's rotation is continued by the action of the current flowing through driving coil 29. Thereafter, a magnetic field of opposite polarity is immediately applied to hall element 50 by permanent magnets 17 and 23 of rotor magnets 11 and 12 to operate driving transistor 55 to apply current through driving coil 31 in the direction of arrows 46 and 47. When current flows through coil 31, it interacts with the magnetic field of permanent magnets 15 and 21 while current flowing through side 39 interacts with permanent magnets 16 and 22 to again add torque to the rotor in the direction of arrow 51. When the rotor rotates in the direction of arrow 51 by a further $\pi/6$ of its rotary angle, hall element 49 is positioned at a dead point of the magnetic field so that the current flowing through driving coil 29 stops. As before, the rotor continues to rotate due to the action of the current flowing through driving coil 31 so that the magnetic field is once again immediately applied to hall element 49 by permanent magnets 15 and 21 to cause driving transistor 52 to operate, applying driving current through driving coil 28 in the direction of arrows 40 and 41, thereby repeating the cycle.

By repetition of the above cycle, the rotor is rotated smoothly in the predetermined direction of arrow 51. Furthermore, whenever the rotor stops in a position, the magnetic field is applied to at least more than one of all elements, so the rotor self-starts at every possible stop position thereof. To change the rotary direction of prior art motors, the terminals of the hall elements were changed, or the driving coils were changed. In the motor in accordance with the invention, it is possible, by changing the direction of current flow through the driving coil, to readily change direction of rotation. As illustrated in FIG. 6, current flows three times through each driving coil 28, 29, 30 and 31 during each period T. Since the hall elements are positioned in a uniform magnetic field, the hall voltage of the hall elements appears and disappears very quickly and the electric current flowing through the driving coils rises and drops quickly. This insures that the motor in accordance with the invention turns smoothly and has favorable torque characteristics.

Figure 7:
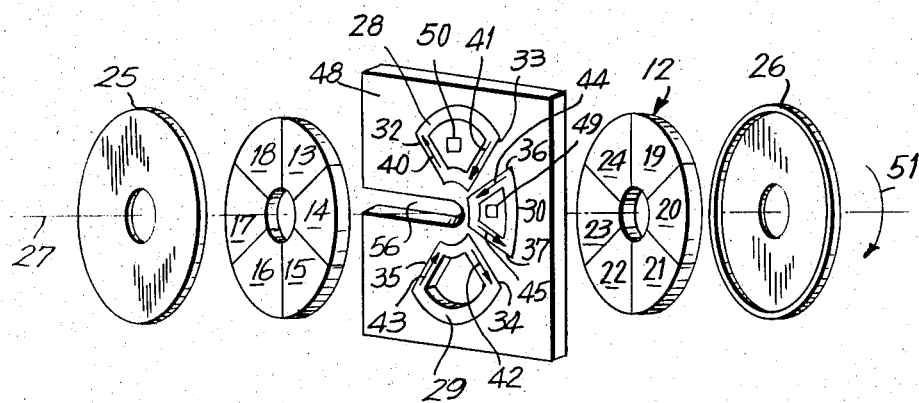
FIGS. 7, 8 and 9 are perspective exploded views of three further embodiments of the motor in accordance with the invention.
Figure 8:
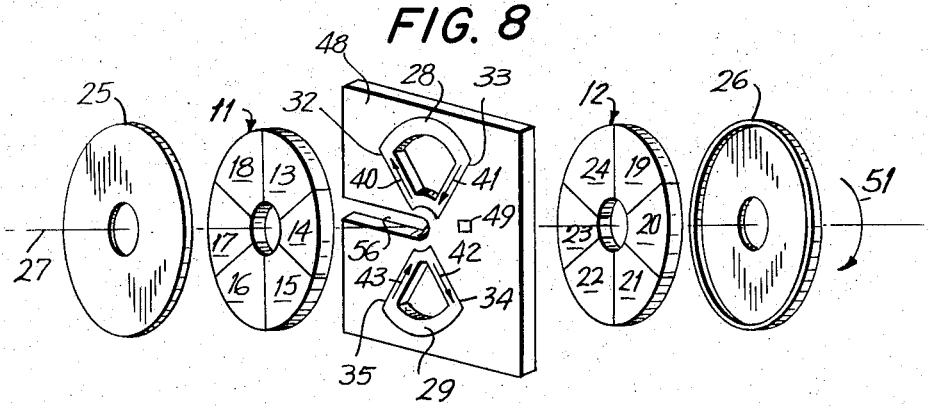

Like reference numerals have been applied to like elements in these figures. In the motor of FIG. 7, driving coil 31 has been omitted while in FIG. 8, driving coils 30 and 31, and hall element 50 are omitted. A groove 56 terminating in the opening defining the rotary axis of the motor on one side and terminating on the outer rim of insulating plate 48 is provided in insulating plate 48 to permit the ready mounting and dismounting of the insulating plate as required without disturbing the magnetic alignment of the rotor. Despite the removal of one or two driving coils from the arrangements of FIGS. 7 and 8, smooth rotation can be maintained.

Figure 9:
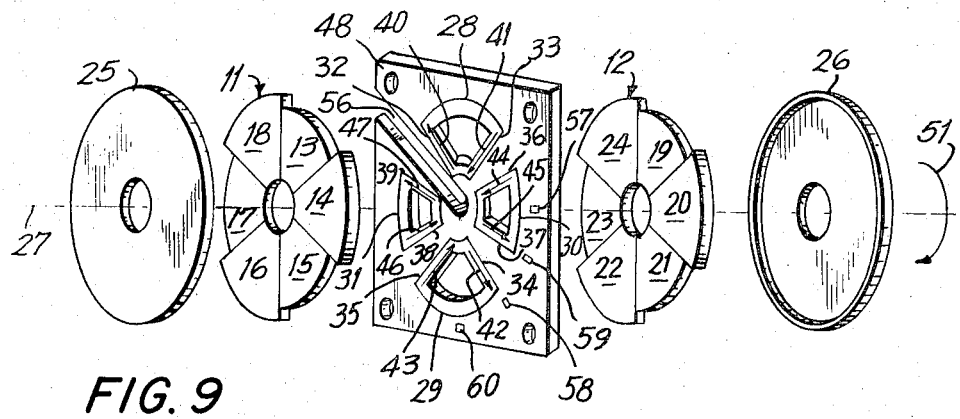
Figure 10:
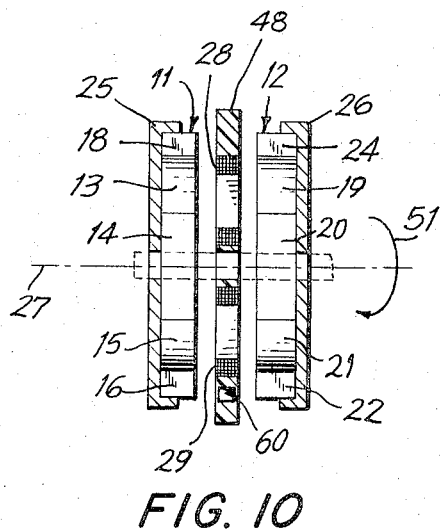
FIG. 10 is a partially sectioned view of the assembled motor of FIG. 9.
Figure 11:
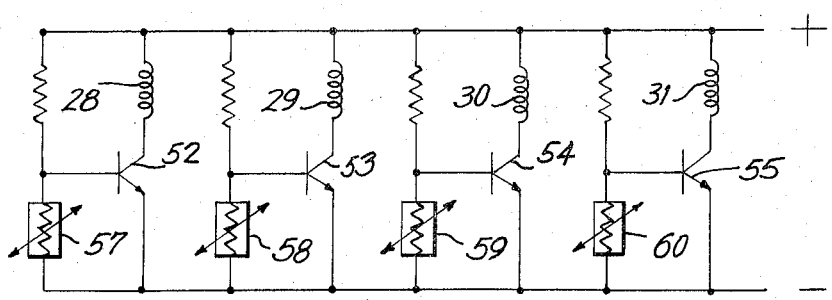
FIG. 11 is a circuit diagram of the control circuitry for the motor of FIG. 9.

FIGS. 9, 10 and 11 illustrates still a further embodiment of the motor in accordance with the invention utilizing a magnetic resistant element as the magnetic sensitive element. Again, like reference numerals are applied to like elements. As shown in FIGS. 9 and 10, three of the six permanent magnets defining each rotor magnet and formed with an enlarged radius, these permanent magnets being specifically permanent magnets 14, 16 and 18 of rotor magnet 11 and permanent magnets 20, 22 and 24 of rotor magnet 12. In effect, alternating permanent magnets of each rotor magnet have the enlarged radius, and are arranged every $\pi/3$. The permanent magnets have the enlarged radius on the two rotor magnets are also arranged so that they are in facing relation. Magnetic resistant elements 57, 58, 59 and 60 are mounted on insulating plate 48 spaced at $\pi/6$ intervals along an arc concentrically related to the axis of rotation of the rotor and positioned within the locus of the permanent magnets having the large radius but outside of the locus of the permanent magnet having the small radius. In view of the $\pi/3$ spacing of the permanent magnets having the large radius, the resistivity of the respective magnetic resistant elements 57, 58, 59 and 60 is changed every $\pi/3$ and they supply current to the corresponding driving coils 28, 29, 30 and 31 with this frequency. The waveforms of the current in the respective driving coils thus produced are the same as those shown in FIG. 6.

Rotor magnets having six poles are depicted in the above-described embodiments, but the arrangement in accordance with the invention is not limited to a six pole embodiment. Further, even though the rotor has more than four poles, the number of hall elements and driving coils does not change, and the arrangement in accordance with the invention is not limited to a particular number of magnetic sensitive elements.

Since the magnetic sensitive elements are disposed in a uniform magnetic field, the resulting motor is of greatly improved efficiency, while the simple construction and flat shape offers other practical advantages. The motor is particularly adapted for mass production and industrial usage.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all stagements of the scope of the invention which, as a matter of language, might be said to fall therebetween.

I claim:

1. A brushless direct current motor which controls driving current by detecting the state of magnetic flux comprising a rotor having a pair of spaced yokes, each of said yokes having a plurality of permanent magnets mounted thereon arranged circumferentially about the rotary axis of said rotor, the permanent magnets on each yoke being polarized in a direction parallel to said rotary axis and so that each adjacent pair of permanent magnets on each yoke are of opposite polarity, said yokes being arranged in spaced relation along said rotary axis with their respective permanent magnets in spaced facing relation to define a gap through which magnetic flux flows in a direction parallel to the rotary axis of said motor; at least one magnetic sensitive element positioned in said gap in the path of said magnetic flux for detecting the state of said magnetic flux; a base plate; a plurality of driving coils mounted on said base plate in said gap in said magnetic circuit means; and driving circuit means coupling said magnetic sensitive element and said driving coils for applying driving current to said driving coils in response to the signal produced by said magnetic sensitive element in response to the state of said magnetic flux.

2. A brushless direct current motor as recited in claim 1, wherein each of said permanent magnets on each of said yokes are essentially pie-shaped, the adjacent edges thereof being substantially contiguous or closely spaced.

3. A brushless direct current motor as recited in claim 1, wherein said magnetic sensitive element is a hall element positioned in the path of magnetic flux of all of said permanent magnets.

4. A brushless direct current motor as recited in claim 3, wherein said coil means are essentially flat coils aligned in a plane passing through said gap and occupying a predetermined sector positioned circumferentially relatively to said rotary axis.

5. A brushless direct current motor as recited in claim 4, wherein each of said driving coils occupies a $\pi/3$ section, each of said yokes carrying at least six pie-shaped permanent magnets.

6. A brushless direct current motor as recited in claim 5, including four of said driving coils spaced concentrically about said rotary axis, and including at least two of said hall elements, said driving circuit means coupling said hall elements and driving coils so that each of said driving coils is actuated by driving current at least three times during each period of rotation of said rotor.

7. A brushless direct current motor as recited in claim 6, wherein said hall elements are each angularly spaced from the driving coils driven thereby by $\pi/2$.

8. A brushless direct current motor as recited in claim 5, including at least three of said driving coils and at least two hall elements.

9. A brushless direct current motor as recited in claim 5, including at least one of said hall elements and at least two of said driving coils.

10. A brushless direct current motor as recited in claim 1, wherein alternating permanent magnets on each of said yokes are dimensioned to project in a radial direction beyond the other of said permanent magnets, the permanent magnets of increased radial dimension on each of said yokes being in facing relation to the permanent magnets of increased radial dimension on the other of said yokes, said magnetic sensitive elements being magnetic resistant elements positioned in the locus of said permanent magnets of increased radial dimension but not in the locus of the other of said permanent magnets.

11. A brushless direct current motor as recited in claim 1, wherein said magnetic sensitive elements, driving coils and magnetic driving circuit are oriented so that a driving current pulse is applied to each of said driving coils more than twice during each period of rotation of said rotor.

* * * * *